Jan. 17, 1939.  A. Y. DODGE ET AL  2,144,012

BRAKE

Original Filed May 21, 1931

INVENTORS.
ADIEL Y. DODGE
BY MONTGOMERY W. McCONKEY
Jerome R. Cox.
ATTORNEY.

Patented Jan. 17, 1939

2,144,012

UNITED STATES PATENT OFFICE 2,144,012

BRAKE

Adiel Y. Dodge and Montgomery W. McConkey, South Bend, Ind., assignors to Bendix Brake Company, South Bend, Ind., a corporation of Illinois Original application May 21, 1931, Serial No. 539,087, now Patent No. 2,071,297, dated February 16, 1937. Divided and this application January 9, 1937, Serial No. 119,714

8 Claims. (Cl. 60—54.6)

This application is a division of our copending application Serial No. 539,087, filed May 21, 1931, and issued as Patent No. 2,071,297 on Feb. 16, 1937.

Our invention relates to brakes and is illustrated as embodied in a system of hydraulic brakes for an automobile.

An object of the invention is to provide a system of this general character which will replenish itself with operating fluid so that there will be no loss of pedal.

Figure 1:
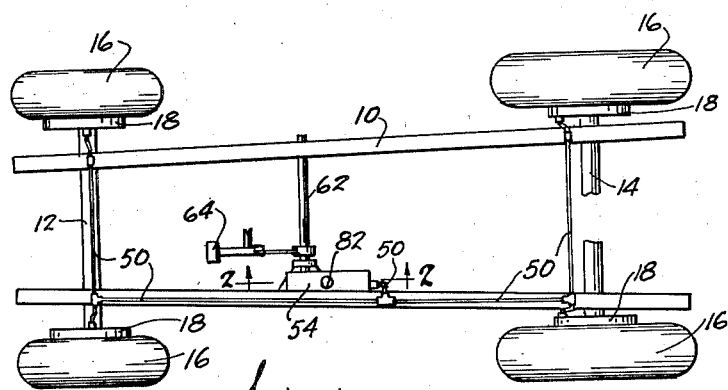
Figure 2:
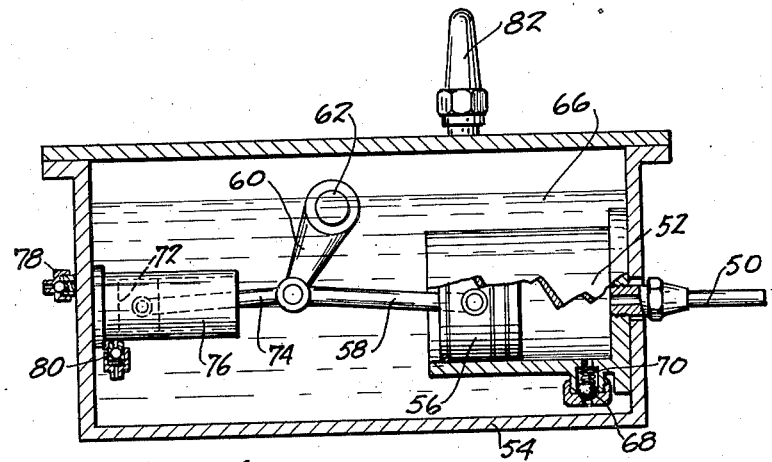

Various features of novelty relate to the general arrangement of the parts of the system to attain the desired result, to the fluid power operating device which maintains a light pressure in the fluid connections and which preferably automatically replenishes itself with fluid, and to various novel and desirable details, all of which will be apparent from the following description of the illustrative embodiment shown in the accompanying drawing, in which:

Figure 1 is a diagrammatic view of an automobile chassis, illustrating the invention as applied; and Figure 2 is a section on line 2—2 of Figure 1 showing the fluid power operating device in longitudinal vertical section.

The chassis illustrated in Figure 1 includes a frame 10, supported by the usual springs on front and rear axles 12 and 14 carried by the usual road wheels 16 having brake drums 18. Each brake preferably includes a support such as a backing plate, mounted on the rear axle 14 or on the usual front knuckle swivelled to the front axle 12 and on which is mounted the friction means of a brake.

The brakes are operated by wheel cylinders which are all connected by flexible connections or conduits 50 with a master cylinder 52, forming part of a fluid power operating device and preferably arranged in a reservoir or housing 54 secured to the chassis frame 10. Cylinder 52 contains an operating piston 56 with a connecting rod 58 by which it is operated from an arm 60 on a shaft 62 operatively connected to the service brake pedal 64. Thus depression of pedal 64 operates the piston 56 to apply force to oil or other fluid in conduits 50 to apply the brakes.

In order to replenish the fluid automatically, for the purpose explained above, reservoir 54 is filled with oil or the like to a level 66 above cylinder 52, and which is permitted ingress to cylinder 52 and connections 50, when under sufficient pressure, through a ball check valve 68 held by a spring 70.

Air is kept compressed in reservoir 54 above the level 66 by a pump operatively connected to the piston 56 and shown as including a piston 72 connected to arm 60 by a connecting rod 74, the piston being arranged in a cylinder 76 having an air intake 78 provided with a suitable check valve, and having an air exhaust 80 inside reservoir 54 and also provided with a suitable check valve.

When the brakes are applied, piston 72 is moved to the right to suck air through the intake 78, while when the brakes are released the usual return spring 65 on pedal 64 (not shown) moves piston 72 to the left to force this air through exhaust 80 into the reservoir 54. A suitable pressure relief valve 82, of any desired construction, holds the pressure of the air in reservoir 54 to a predetermined maximum which, of course, is necessarily low enough to be overcome by the pedal return spring, but high enough to overcome spring 70 and force additional fluid into the system to replenish that lost by leakage and to add enough to compensate for the gradual separation of the pistons 30 as the brakes wear. Thus the fluid in connections 50 is always under a light pressure insufficient to overcome the springs 28, but sufficient to insure that pistons 30 are at all times urged yieldingly apart against shoes 22 and 24.

It will be understood that while the illustrated embodiment of the invention is described as shown, a considerable latitude is to be permitted in construction within the range of the appended claims.

We claim:

1. A fluid power device for a brake system or the like comprising, in combination, an operating piston and a cylinder therefor having a check valve permitting the ingress of fluid to the cylinder, a supply of fluid communicating with said valve, and a pump connected to said piston and actuated on the release movement thereof to build up air pressure on said fluid.

2. A fluid power device for a brake system or the like comprising, in combination, an operating piston and a cylinder therefor having a check valve permitting the ingress of fluid to the cylinder, a supply of fluid communicating with said valve, a pump actuated on the release movement of said piston to build up air pressure on said fluid, and common actuating means for the piston and said pump.

3. A fluid power device for a brake system or the like comprising, in combination, an operating piston and a cylinder therefor having a check valve permitting the ingress of fluid to the cylinder, a supply of fluid communicating with said valve, and a pump for building up air pressure on the operating fluid, said pump comprising a cylinder having an inwardly opening check valve communicating with the atmosphere, an outwardly opening check valve communicating with said supply of fluid, a pump piston in said cylinder, and a link connecting said pump piston with the operating piston.

4. In a fluid brake system, the combination of means for applying pressure to the fluid in the brake system and including a fluid reservoir, means for allowing fluid from said fluid reservoir to flow to the fluid brake system when the fluid pressure applying means is in an inoperative position, and means for applying a substantially constant predetermined pressure to the fluid in said fluid reservoir to maintain a substantially constant predetermined initial fluid pressure in said brake system, said last mentioned means being actuated by a pivotally mounted member operatively connecting said last mentioned means with said first mentioned means.

5. In a fluid brake system, the combination of means for applying pressure to the fluid in the brake system and including a fluid reservoir, means for allowing fluid from said fluid reservoir to flow to the fluid brake system, when the fluid pressure applying means is in an inoperative position, and an air pump actuated in response to the actuation of said pressure applying means for introducing air under a predetermined pressure into said fluid reservoir to maintain a substantially constant predetermined initial fluid pressure in said brake system, and means operatively connecting said air pump and said means for applying pressure to cause said air pump and said means for applying fluid pressure to be actuated alternately on their air and fluid pressure applying strokes.

6. In a fluid brake system, the combination of means for applying pressure to the fluid of the brake system, an air pump, pivotally mounted means for reciprocating said air pump, and means for connecting said pivotally mounted means between the fluid pressure applying means and the air pump.

7. In a fluid brake system for applying pressure to the fluid in the brake system comprising a fluid reservoir from which fluid may flow to said fluid brake system, a fluid chamber in communication with the fluid brake system, a piston operating in said chamber, and means for introducing air under a predetermined pressure into said fluid reservoir to maintain a substantially constant initial fluid pressure in said brake system, said last mentioned means and said piston being operatively connected by a member mounted therebetween.

8. In a fluid brake system, the combination of a master cylinder provided with a reservoir, an air chamber associated with the reservoir in said master cylinder, air pump means for building up air pressure in said air chamber, valve means for connecting said air pump means and the reservoir of said master cylinder, means for applying pressure to the fluid of the brake system, and means operatively connecting said last mentioned means and said air pump means.

ADIEL Y. DODGE.
MONTGOMERY W. McCONKEY.